March 12, 1940.  A. I. INNES  2,192,972
SEISMIC SURVEYING
Filed Oct. 21, 1937
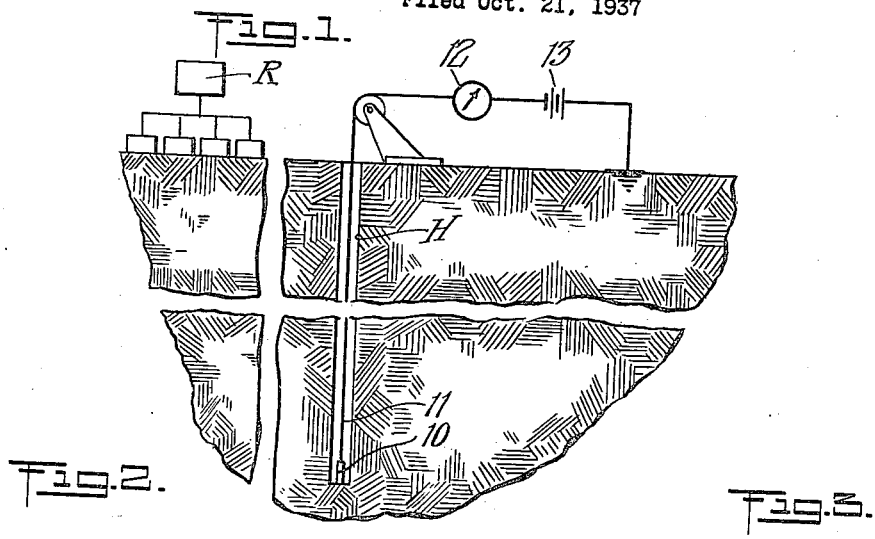
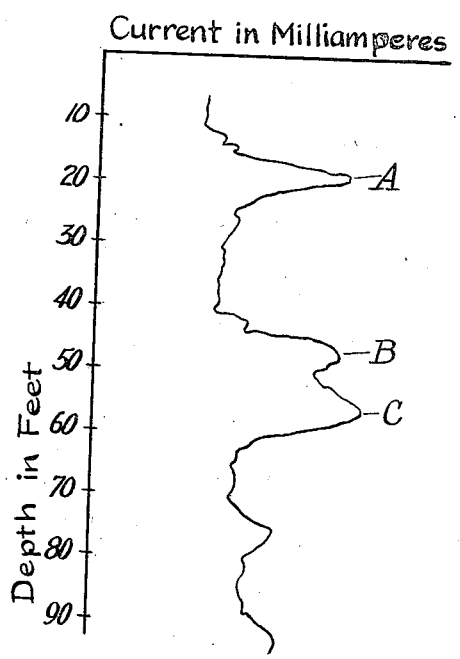
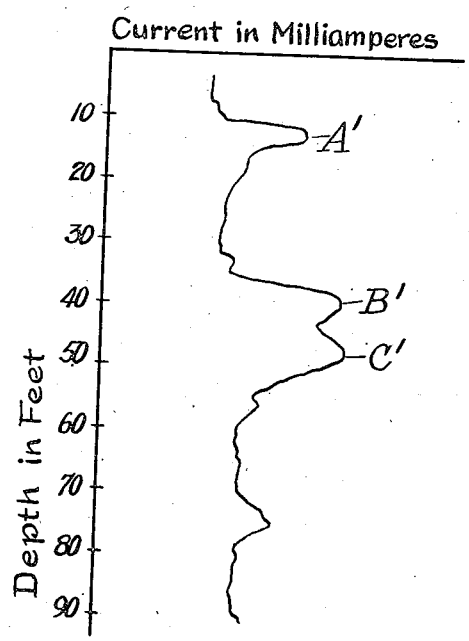
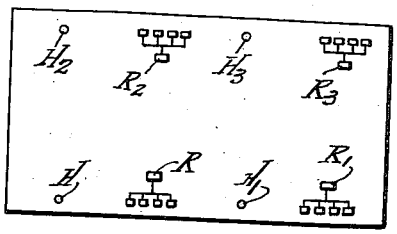
INVENTOR.
Arland I. Innes
BY Kenyon & Kenyon
ATTORNEYS.

Patented Mar. 12, 1940

2,192,972

UNITED STATES PATENT OFFICE 2,192,972

SEISMIC SURVEYING

Arland I. Innes, Fort Worth, Tex., assignor to Geophysical Research Corporation, New York, N. Y., a corporation of New Jersey Application October 21, 1937, Serial No. 170,219

3 Claims. (Cl. 181—0.5)

This invention relates to seismic surveying and has for its object a method of selecting the most suitable depth at which to plant the seismic charge in a shot hole.

In making seismic surveys by the reflection method, it is customary to plant the explosive charge in a shot hole at a depth below the surface which may be as little as 10 feet or as much as 300 feet. In many areas, the exact depth at which the shot is planted is not at all critical and clear-cut reflections are obtainable with the charge planted at any one of a variety of depths. In other areas, the quality of the reflections is independent of the depth at which the shot is planted provided the shot is planted below the existing water table. Still other areas are characterized by a surface layer of such nature that the depth at which the charge should be planted for high quality results is quite critical and a seismic charge detonated at some depth or depths in a bore hole in such layer produces a seismic record which is not correlatable with other records obtained by detonating seismic charges in other holes in the same area. In such areas, it has heretofore been difficult to determine the best depth at which to plant the shot and one prior practice which has been used consists of making a record of the type of material found in a shot hole at different depths while drilling the hole and then placing the shot in that type of material which, by experiment, has been found to give the best results in that area. This method is impractical in many cases due to the fact that it is very difficult to prepare such a record when the holes are dug by portable rotary drilling rigs of the type customarily used for the purpose. In order to obtain accurate logs of the holes, it is necessary to use drilling methods of a type that are more costly than it is practical to use. Furthermore, even if accurate drilling logs are obtained, this method frequently fails because the quality of the reflection seems to be dependent upon other factors in addition to that of the material in which the charge is planted. Another prior procedure is to detonate charges at several depths in each shot hole, take a separate record of each shot and then choose for use that record which most closely resembles in character similar records taken in other shot holes in the area under investigation. This procedure involves the making of a large number of records of which no use is made and the attendant expense of the explosive charges and the labor involved.

According to the present invention, when starting work in a new area, a test hole is dug somewhat deeper than the lowest depth at which it is expected to fire a shot. A resistivity survey of the test hole is made according to any one of the well-known methods such, for example, as the one described in Schlumberger Patent No. 1,819,923. Such survey need not measure accurately the specific resistivity of the material at a given depth, but need merely provide a record indicating how the resistivity changes with depth. From the data thus obtained, a resistivity-depth graph is plotted. A large number of seismic reflection records are then made, each record being made with the detectors planted in the same position but with the seismic charge planted at a different depth in the test hole. From these records is determined the depth from which the best quality record was obtained and on the resistivity-depth graph of the test hole is indicated the depth at which the charge was planted to give the best reflection quality.

Similar resistivity-depth logs are made of each shot hole used in surveying the area, these logs, of course, being made before shots are fired in the holes. The log of each individual shot hole is compared with the log of the test hole and a correlation made between them. By such correlation is determined the depth of the shot in each shot hole which corresponds to the depth in the test hole from which the best quality record was obtained. The seismic charge is then planted in each shot hole at the depth so determined for such hole.

The above process may be more clearly understood by referring to the following specification and accompanying drawing, wherein:

Fig. 1 illustrates procedural steps involved in the practice of the invention;

Fig. 2 is a graph illustrating the resistivity record of the test hole;

Fig. 3 is a graph illustrating the resistivity record of another hole, and

Fig. 4 represents an area under survey.

A metal electrode 10 is attached to an insulated single conductor cable 11 and means (not shown) is provided for raising and lowering the electrode 10 in the test hole H. The end of the cable 11 is connected through a milliameter 12 with one terminal of a source 13 of constant voltage, the other terminal of which is grounded. The electrode 10 is lowered slowly into the test hole and a record is made of the current flowing through the milliameter at different positions of the electrode. From the data thus obtained, the graph shown in Fig. 2 is plotted, the graph of current against depth being representative of the variation of the resistivity with depth. A plurality of explosive charges are detonated at different depths in the hole H and reflection records of the waves thus produced are made at a recording station consisting of a plurality of wave detectors associated in the well-known manner with a recorder R, (Fig. 1). The reflection records thus obtained are inspected and from such records is selected the record having the best quality, the selection being made on the basis of the judgment of the individual whose duty it is to make the selection, and determination is made as to the depth of the charge resulting in the best reflection record.

Assume that the reflection record selected as having the best quality was obtained from a shot in the hole H at a depth of 57 feet. The point on the graph of Fig. 2 corresponding to said depth is determined and for reference purposes is labeled C.

A resistivity graph is made for each of a plurality of shot holes $H_1$, $H_2$ and $H_3$ in the area under survey, such shot holes having associated therewith respectively recording stations $R_1$, $R_2$ and $R_3$ as shown in Fig. 4. In Fig. 3 is illustrated the resistivity graph of one of such shot holes, for example, $H_1$ and by comparison of Figs. 2 and 3, it is apparent that the point A' on the graph of Fig. 3 corresponds to the point A on the graph of Fig. 2, that the point B' on the graph of Fig. 3 corresponds to the point B on the graph of Fig. 2 and that the point C' on the graph of Fig. 3 corresponds to the point C on the graph of Fig. 2. Also, it will be apparent from these graphs that corresponding points thereon indicate different depths in the two holes. The resistivity graph of Fig. 3 shows that in the hole $H_1$ there exists at the depth of 47 feet (corresponding to the point C') a resistivity condition corresponding to the resistivity condition in the hole H at the depth of 57 feet (corresponding to the point C). Therefore, the explosive charge is planted in the hole $H_1$, at the depth of 47 feet so that it will be fired under the same resistivity condition as was the shot in the hole H which gave the best quality record and consequently the record obtained from such shot in the hole $H_1$ will be the best quality record obtainable at any depth in the hole $H_1$.

It is apparent that some variation in the above procedure may be made. In particular, the resistivity log of the test shot hole might be made after the test shots have been detonated therein, provided the hole remains open after the shooting. Another possibility is planting the test shot in one hole and making the resistivity survey in a separate hole closely adjacent thereto.

Although this invention is primarily concerned with the art of seismic surveying by the reflection method, it is also applicable to the seismic refraction method. In the former case, the object of the invention is to find that depth at which the charge should be planted to give best reflection quality; in the latter case, to find at which depth the charge should be planted to produce maximum seismic energy. The applicability of the invention to the refraction method is somewhat limited because of the very large charges of explosive customarily used.

I claim:

1. In the method of seismic surveying by correlation of reflection records produced by detonation of explosive charges in bore holes in an area characterized by a surface layer of such nature that a seismic charge detonated at some depth or depths in the bore hole produces a seismic record which is not correlatable with records obtained by detonating seismic charges in other similar bore holes, the procedure which consists in making a resistivity-depth graph of the materials traversed by a test shot hole, determining the depth at which the charge should be planted in said test hole to obtain best reflection quality and establishing the corresponding point on said test hole resistivity-depth graph, making resistivity-depth graphs of other shot holes, selecting the point on each of such graphs corresponding to said point on the test shot hole resistivity-depth graph, establishing the depth in each shot hole corresponding to the point so selected and making records of the seismic waves produced by detonating explosive charges planted at said selected depths.

2. In the method of seismic surveying by correlation of reflection records produced by detonation of explosive charges in bore holes in an area characterized by a surface layer of such nature that a seismic charge detonated at some depth or depths in the bore hole produces a seismic record which is not correlatable with records obtained by detonating seismic charges in other similar bore holes, the procedure which consists in making a resistivity-depth graph of the materials traversed by a test shot hole, determining the depth at which a charge should be planted in said test hole to obtain best reflection quality and establishing the corresponding point on said test hole resistivity-depth graph, making resistivity depth graphs of other shot holes, selecting the point on each of said graphs corresponding to said point on the test shot hole resistivity-depth graph, establishing the depth in each shot hole corresponding to the point so selected and making reflection records of the seismic waves produced by detonating explosive charges planted at said selected depths.

3. In the method of seismic surveying by correlation of reflection records produced by detonation of explosive charges in bore holes in an area characterized by a surface layer of such nature that a seismic charge detonated at some depth or depths in the bore hole produces a seismic record which is not correlatable with records obtained by detonating seismic charges in other similar bore holes, the procedure which consists in making an electrical characteristic-depth graph of the materials traversed by a test shot hole, determining the depth at which a charge should be planted in said test hole to obtain best reflection quality and establishing the corresponding point on said test hole electrical characteristic-depth graph, making electrical characteristic-depth graphs of other shot holes, selecting the point on each of said graphs corresponding to said point on the test shot hole electrical characteristic-depth graph, establishing the depth in each shot hole corresponding to the point so selected and making records of the seismic waves produced by detonating explosive charges planted at said selected depths.

ARLAND I. INNES.